United States Patent
Dreps et al.

(10) Patent No.: US 10,901,936 B2
(45) Date of Patent: Jan. 26, 2021

(54) STAGED POWER ON/OFF SEQUENCE AT THE I/O PHY LEVEL IN AN INTERCHIP INTERFACE

(71) Applicant: International Business Machines Corporation, Armonk, NY (US)

(72) Inventors: Daniel M. Dreps, Georgetown, TX (US); Prasanna Jayaraman, Austin, TX (US); Michael B. Spear, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 76 days.

(21) Appl. No.: 15/215,636

(22) Filed: Jul. 21, 2016

(65) Prior Publication Data

US 2018/0024963 A1    Jan. 25, 2018

(51) Int. Cl.
*G06F 13/42* (2006.01)
*G06F 13/22* (2006.01)

(52) U.S. Cl.
CPC .......... *G06F 13/4291* (2013.01); *G06F 13/22* (2013.01)

(58) Field of Classification Search
None
See application file for complete search history.

(56) References Cited

U.S. PATENT DOCUMENTS

| 6,134,676 | A | 10/2000 | Vanhuben et al. |
| 6,496,925 | B1 | 12/2002 | Rodgers et al. |
| 7,080,288 | B2 | 7/2006 | Ferraiolo et al. |

(Continued)

FOREIGN PATENT DOCUMENTS

| JP | 2009259217 A | 11/2009 |
| JP | 2011181006 A | 9/2011 |

(Continued)

OTHER PUBLICATIONS

A. Mochizuki et al., "Design of a Quaternary Single-Ended Current-Mode Circuit for an Energy-Efficient Inter-Chip Asynchronous Communication Link", IEEE, 2014, 44th International Symposium on Multiple-Valued Logic, pp. 67-72.

(Continued)

*Primary Examiner* — Henry Tsai
*Assistant Examiner* — Christopher A Bartels
(74) *Attorney, Agent, or Firm* — Law Office of Jim Boice (57) ABSTRACT

A method, system, and/or computer program product controls transitions from a first bandwidth to a second bandwidth in a bus within a multi-processor computer. A bus controller predicts a bandwidth transition requirement for a bus in a multi-processor computer, and transitions the bus from a first bandwidth to a second bandwidth based on the predicted bandwidth transition requirement. The bus controller checks an actual transitioning requirement of the bus in the computer, such that the bus controller checks the actual transitioning requirement for the bus at each occurrence of a predefined stage of operation of one or more processor processors in the computer. In response to the actual transitioning requirement matching the predicted bandwidth transition requirement, the bus controller directions a continuation of the transitioning of the bus from the first bandwidth to the second bandwidth.

20 Claims, 6 Drawing Sheets

(56) References Cited

U.S. PATENT DOCUMENTS

| | | |
|---|---|---|
| 7,116,682 B1 | 10/2006 | Waclawsky et al. |
| 7,117,126 B2 | 10/2006 | Floyd et al. |
| 7,613,126 B1 | 11/2009 | Natarajan et al. |
| 7,721,039 B2 | 5/2010 | Irisa |
| 8,050,174 B2 | 11/2011 | Becker et al. |
| 8,850,091 B1 * | 9/2014 | Karamcheti ........ G06F 12/0246 710/62 |
| 8,963,599 B2 | 2/2015 | Dobbs et al. |
| 8,995,289 B2 | 3/2015 | Diab et al. |
| 9,215,092 B2 | 12/2015 | Lin et al. |
| 9,324,030 B2 | 4/2016 | Dreps et al. |
| 9,324,031 B2 | 4/2016 | Dreps et al. |
| 10,341,135 B2 * | 7/2019 | Kacel ....................... H04L 12/40 |
| 2002/0009149 A1 * | 1/2002 | Rodriguez ....... H04N 21/25808 375/240.25 |
| 2003/0088799 A1 | 5/2003 | Bodas |
| 2003/0202482 A1 | 10/2003 | Dittmann et al. |
| 2005/0119860 A1 | 6/2005 | Hsu et al. |
| 2008/0307240 A1 * | 12/2008 | Dahan ....................... G06F 1/06 713/320 |
| 2009/0249089 A1 * | 10/2009 | Tremel .................. G06F 1/3296 713/300 |
| 2009/0249090 A1 * | 10/2009 | Schmitz ................ G06F 1/3203 713/300 |
| 2010/0082851 A1 | 4/2010 | Green et al. |
| 2011/0055370 A1 | 3/2011 | Kern et al. |
| 2011/0222111 A1 | 9/2011 | Shima |
| 2011/0264862 A1 * | 10/2011 | Karlsson .............. G06F 9/3802 711/125 |
| 2013/0159761 A1 | 6/2013 | Baumgartner et al. |
| 2013/0297833 A1 * | 11/2013 | Vadivelu ............... G06F 13/126 710/5 |
| 2014/0129867 A1 * | 5/2014 | Caruk ....................... G06F 1/00 713/500 |
| 2014/0281071 A1 * | 9/2014 | Xu .......................... G06F 13/42 710/105 |
| 2014/0281108 A1 * | 9/2014 | Pethe .................. G06F 13/4027 710/313 |
| 2015/0067210 A1 | 3/2015 | Iyer et al. |
| 2015/0162068 A1 * | 6/2015 | Woo .................. G11C 11/40615 365/222 |
| 2015/0280904 A1 * | 10/2015 | Tang ....................... H04L 7/048 714/758 |
| 2015/0301575 A1 | 10/2015 | Dreps et al. |
| 2015/0301576 A1 | 10/2015 | Dreps et al. |
| 2016/0048473 A1 | 2/2016 | Dreps et al. |
| 2016/0050301 A1 | 2/2016 | Dreps et al. |
| 2016/0104522 A1 * | 4/2016 | Son ....................... G11C 11/005 711/103 |
| 2019/0260380 A1 * | 8/2019 | Carlough ............... H03L 7/081 |

FOREIGN PATENT DOCUMENTS

| | | |
|---|---|---|
| KR | 101516533 | 5/2015 |
| WO | 2013165416 A1 | 11/2013 |

OTHER PUBLICATIONS

E. Shih et al., "Physical Layer Driven Protocol and Algorithm Design for Energy-Efficient Wireless Sensor Networks", ACM, 2001, MOBICOM'01, pp. 1-14.

U.S. Appl. No. 14/299,419, Non-Final Office Action, dated Jul. 1, 2015.

* cited by examiner

| WORKLOAD TYPE | REQUEST PUMPS | DATA TRANSFER | TOTAL CYCLES | AVERAGE CY/DATA | REQUIRED B/W MODE |
|---|---|---|---|---|---|
| ·WL1 | 89 | 15 | 45096 | 3006.4 | ·2B |
| ·WL2 | 79 | 17 | 136485 | 8028.529 | ·2B |
| ·WL3 | 77 | 17 | 4580 | 269.4118 | ·4B |
| ·WL4 | 72 | 23 | 13866 | 602.8696 | ·2B |
| ·WL5 | 103 | 17 | 13806 | 812.1176 | ·2B |
| ·WL6 | 102 | 17 | 21692 | 1276 | ·2B |
| ·WL7 | 106 | 17 | 2687 | 158.0588 | ·4B |
| ·WL8 | 102 | 20 | 5932 | 296.6 | ·4B |
| ·WL9 | 96 | 26 | 5366 | 206.3846 | ·4B |
| ·WL10 | 103 | 27 | 3250 | 120.3704 | ·4B |
| ·WL11 | 96 | 26 | 5685 | 2186538 | ·4B |
| ·WL12 | 101 | 25 | 1316 | 52.64 | ·4B |

STAGED POWER ON/OFF SEQUENCE AT THE I/O PHY LEVEL IN AN INTERCHIP INTERFACE

BACKGROUND

The present disclosure relates to the field of processors, and more specifically to the field of processor cores. Still more specifically, the present disclosure relates to the power ON/OFF sequence of a host bus between the processor chips, in other words interchip interface.

SUMMARY

In one or more embodiments of the present invention, a method, system, and/or computer program product controls transitions from a first bandwidth to a second bandwidth in a bus between processors in a multi-processor computer. A bus controller predicts a bandwidth transition requirement for a bus in a multi-processor computer, and transitions the bus from a first bandwidth to a second bandwidth based on the predicted bandwidth transition requirement. The bus controller checks an actual transitioning requirement of the bus in the multi-processor computer, such that the bus controller checks the actual transitioning requirement for the bus at each occurrence of a predefined stage of operation of one or more processors in the computer. In response to the actual transitioning requirement matching the predicted bandwidth transition requirement, the bus controller directs the continuation of the transitioning of the bus from the first bandwidth to the second bandwidth.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
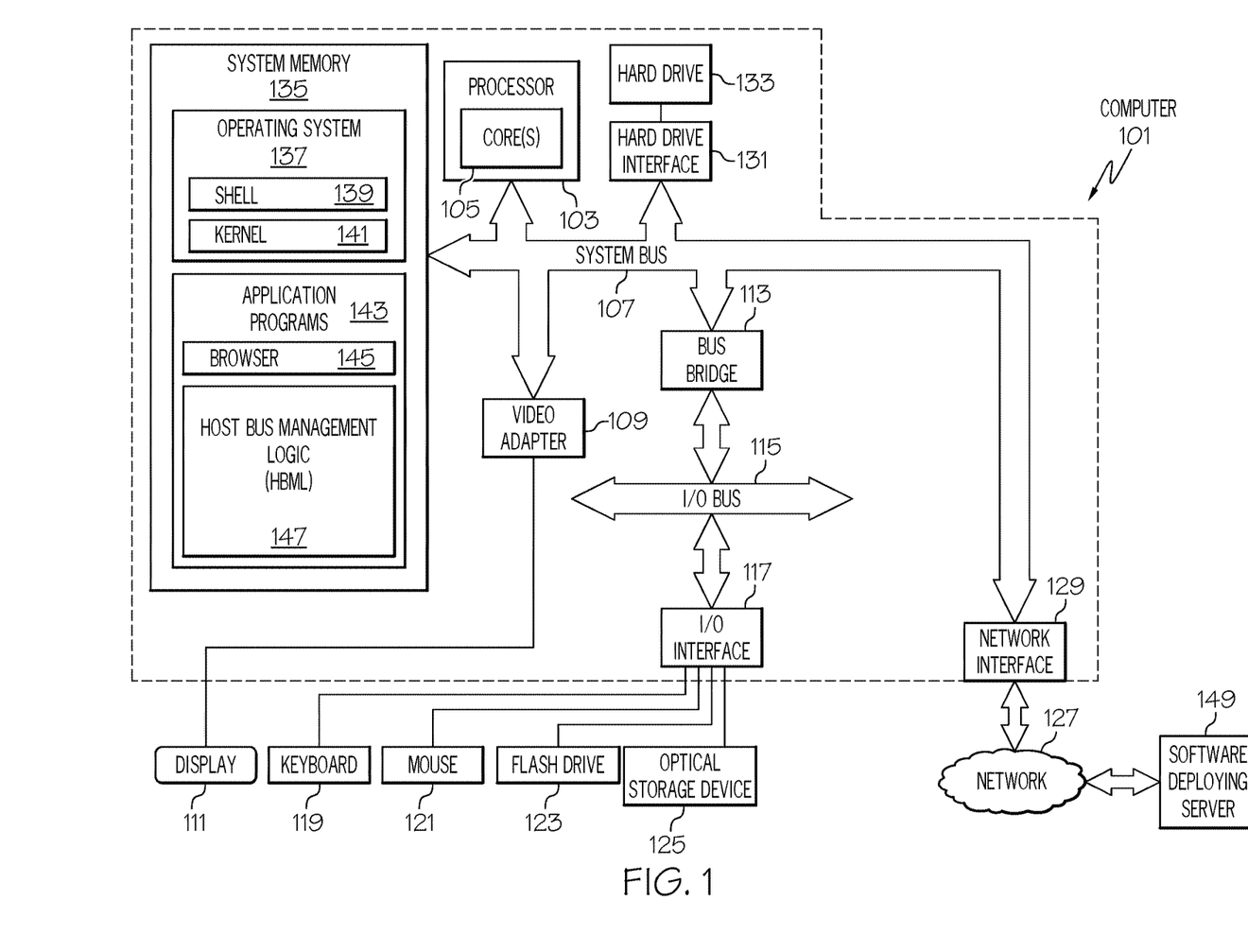
FIG. 1 depicts an exemplary computer system and/or network which may be utilized by the present invention.

With reference now to the figures, and particularly to FIG. 1, there is depicted a block diagram of an exemplary computer 101, within which the present invention may be utilized. Note that some or all of the exemplary architecture shown for computer 101 may be utilized by software deploying server 149 shown in FIG. 1.

Computer 101 includes a processor 103, which may utilize one or more processors each having one or more processor cores 105. Processor 103 is coupled to a system bus 107. A video adapter 109, which drives/supports a display 111, is also coupled to system bus 107. System bus 107 is coupled via a bus bridge 113 to an Input/Output (I/O) bus 115. An I/O interface 117 is coupled to I/O bus 115. I/O interface 117 affords communication with various I/O devices, including a keyboard 119, a mouse 121, a Flash Drive 123, and an optical storage device 125 (e.g., a CD or DVD drive). The format of the ports connected to I/O interface 117 may be any known to those skilled in the art of computer architecture, including but not limited to Universal Serial Bus (USB) ports.

Computer 101 is able to communicate with a software deploying server 149 and other devices via network 127 using a network interface 129, which is coupled to system bus 107. Network 127 may be an external network such as the Internet, or an internal network such as an Ethernet or a Virtual Private Network (VPN). Network 127 may be a wired or wireless network, including but not limited to cellular networks, Wi-Fi networks, hardwired networks, etc.

A hard drive interface 131 is also coupled to system bus 107. Hard drive interface 131 interfaces with a hard drive 133. In a preferred embodiment, hard drive 133 populates a system memory 135, which is also coupled to system bus 107. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a World Wide Web (WWW) client (i.e., computer 101) to send and receive network messages to the Internet using HyperText Transfer Protocol (HTTP) messaging, thus enabling communication with software deploying server 149 and other described computer systems.

Application programs 143 in computer 101's system memory (as well as software deploying server 149's system memory) also include a Host Bus Management Logic (HBML) 147. HBML 147 includes code for implementing the processes described below in FIGS. 3-6. In one embodiment, computer 101 is able to download HBML 147 from software deploying server 149, including in an on-demand basis.

The hardware elements depicted in computer 101 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
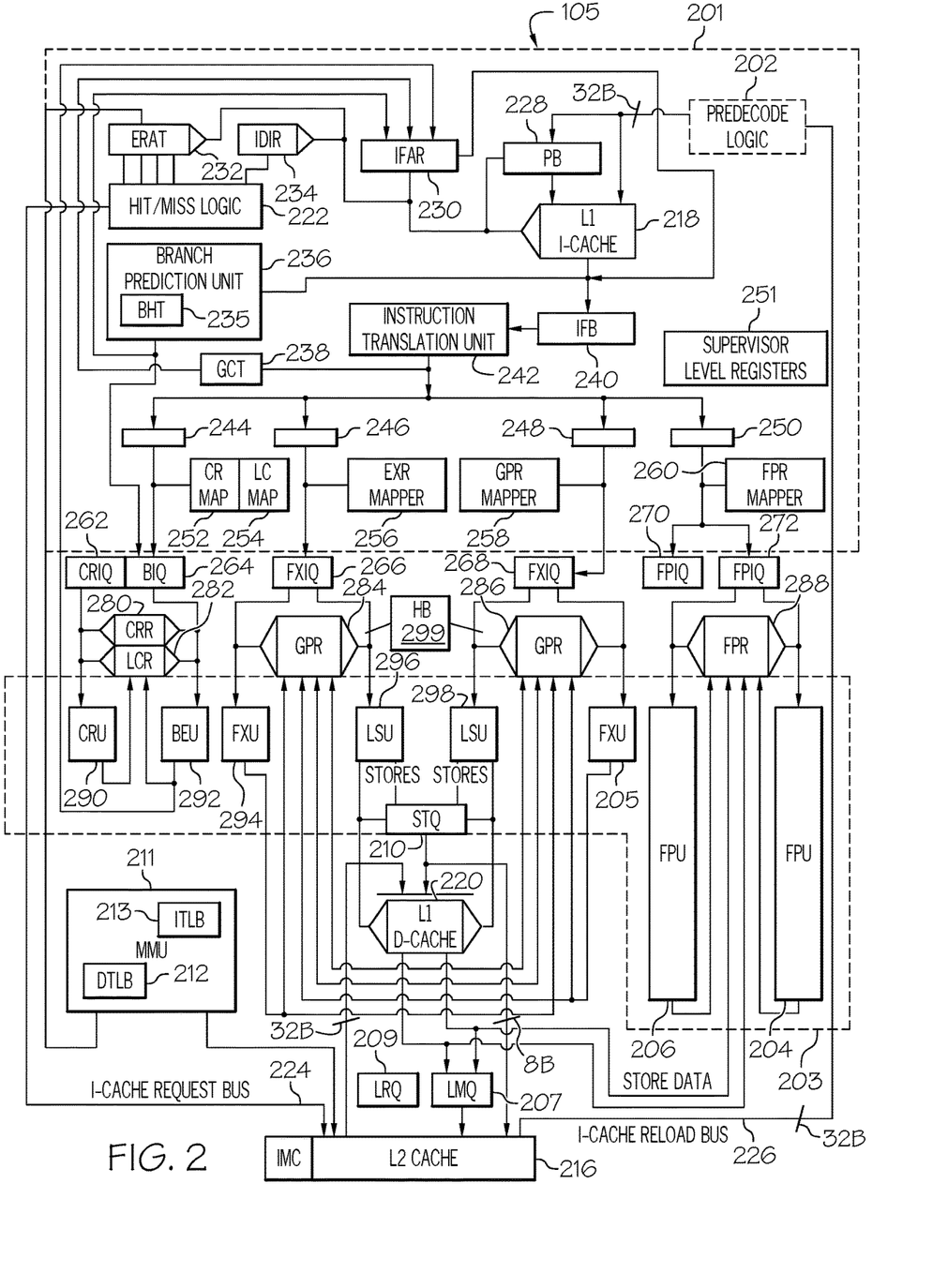
FIG. 2 illustrates additional exemplary detail of a processor core depicted in FIG. 1.

With reference now to FIG. 2, additional exemplary detail of core 105 depicted in FIG. 1 is presented. Core 105 includes an on-chip multi-level cache hierarchy including a unified level two (L2) cache 216 and bifurcated level one (L1) instruction (I) and data (D) caches 218 and 220, respectively. As is well-known to those skilled in the art, caches 216, 218 and 220 provide low latency access to cache lines corresponding to memory locations in system memories (e.g., system memory 135 shown in FIG. 1).

Instructions are fetched for processing from L1 I-cache 218 in response to the effective address (EA) residing in instruction fetch address register (IFAR) 230. During each cycle, a new instruction fetch address may be loaded into IFAR 230 from one of three sources: branch prediction unit (BPU) 236, which provides speculative target path and sequential addresses resulting from the prediction of conditional branch instructions, global completion table (GCT) 238, which provides flush and interrupt addresses, and branch execution unit (BEU) 292, which provides non-speculative addresses resulting from the resolution of predicted conditional branch instructions. Associated with BPU 236 is a branch history table (BHT) 235, in which are recorded the resolutions of conditional branch instructions to aid in the prediction of future branch instructions.

An effective address (EA), such as the instruction fetch address within IFAR 230, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 105, effective-to-real address translation is performed by memory management units (MMUs) and associated address translation facilities. Preferably, a separate MMU is provided for instruction accesses and data accesses. In FIG. 2, a single MMU 211 is illustrated, for purposes of clarity, showing connections only to Instruction Store Unit (ISU) 201. However, it is understood by those skilled in the art that MMU 211 also preferably includes connections (not shown) to load/store units (LSUs) 296 and 298 and other components necessary for managing memory accesses. MMU 211 includes Data Translation Lookaside Buffer (DTLB) 212 and Instruction Translation Lookaside Buffer (ITLB) 213. Each TLB contains recently referenced page table entries, which are accessed to translate EAs to RAs for data (DTLB 212) or instructions (ITLB 213). Recently referenced EA-to-RA translations from ITLB 213 are cached in EOP effective-to-real address table (ERAT) 232.

If hit/miss logic 222 determines, after translation of the EA contained in IFAR 230 by ERAT 232 and lookup of the real address (RA) in I-cache directory 234, that the cache line of instructions corresponding to the EA in IFAR 230 does not reside in L1 I-cache 218, then hit/miss logic 222 provides the RA to L2 cache 216 as a request address via I-cache request bus 224. Such request addresses may also be generated by prefetch logic within L2 cache 216 based upon recent access patterns. In response to a request address, L2 cache 216 outputs a cache line of instructions, which are loaded into prefetch buffer (PB) 228 and L1 I-cache 218 via I-cache reload bus 226, possibly after passing through optional predecode logic 202.

Once the cache line specified by the EA in IFAR 230 resides in L1 I-cache 218, L1 I-cache 218 outputs the cache line to both branch prediction unit (BPU) 236 and to instruction fetch buffer (IFB) 240. BPU 236 scans the cache line of instructions for branch instructions and predicts the outcome of conditional branch instructions, if any. Following a branch prediction, BPU 236 furnishes a speculative instruction fetch address to IFAR 230, as discussed above, and passes the prediction to branch instruction queue (BIQ) 264 so that the accuracy of the prediction can be determined when the conditional branch instruction is subsequently resolved by branch execution unit 292.

IFB 240 temporarily buffers the cache line of instructions received from L1 I-cache 218 until the cache line of instructions can be translated by instruction translation unit (ITU) 242. In the illustrated embodiment of core 105, ITU 242 translates instructions from user instruction set architecture (UISA) instructions into a possibly different number of internal ISA (IISA) instructions that are directly executable by the execution units of core 105. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 238 to an instruction group, the members of which are permitted to be dispatched and executed out-of-order with respect to one another. Global completion table 238 tracks each instruction group for which execution has yet to be completed by at least one associated EA, which is preferably the EA of the oldest instruction in the instruction group.

Following UISA-to-IISA instruction translation, instructions are dispatched to one of latches 244, 246, 248 and 250, possibly out-of-order, based upon instruction type. That is, branch instructions and other condition register (CR) modifying instructions are dispatched to latch 244, fixed-point and load-store instructions are dispatched to either of latches 246 and 248, and floating-point instructions are dispatched to latch 250. Each instruction requiring a rename register for temporarily storing execution results is then assigned one or more rename registers by the appropriate one of CR mapper 252, link and count (LC) register mapper 254, exception register (XER) mapper 256, general-purpose register (GPR) mapper 258, and floating-point register (FPR) mapper 260.

The dispatched instructions are then temporarily placed in an appropriate one of CR issue queue (CRIQ) 262, branch issue queue (BIQ) 264, fixed-point issue queues (FXIQs) 266 and 268, and floating-point issue queues (FPIQs) 270 and 272. From issue queues 262, 264, 266, 268, 270 and 272, instructions can be issued opportunistically to the execution units of processor 103 (shown in FIG. 1) for execution as long as data dependencies and antidependencies are observed. The instructions, however, are maintained in issue queues 262-272 until execution of the instructions is complete and the result data, if any, are written back, in case any of the instructions need to be reissued.

As illustrated, the execution units of core 105 include an execution subcomponent 203, which includes a CR unit (CRU) 290 for executing CR-modifying instructions, a branch execution unit (BEU) 292 for executing branch instructions, two fixed-point units (FXUs) 294 and 205 for executing fixed-point instructions, two load-store units (LSUs) 296 and 298 for executing load and store instructions, and two floating-point units (FPUs) 206 and 204 for executing floating-point instructions. Each of execution units 290-294 and 204-206 is preferably implemented as an execution pipeline having a number of pipeline stages.

During execution within one of execution units 290-294 and 204-206, an instruction receives operands, if any, from one or more architected and/or rename registers within a register file coupled to the execution unit. When executing CR-modifying or CR-dependent instructions, CRU 290 and BEU 292 access the CR register file 280, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 282 contains a count register (CTR), a link register (LR) and rename registers of each, by which BEU 292 may also resolve conditional branches to obtain a path address. General-purpose register files (GPRs) 284 and 286, which are synchronized, duplicate register files, and store fixed-point and integer values accessed and produced by FXUs 294 and 205 and LSUs 296 and 298. Note that floating-point register file (FPR) 288, which like GPRs 284 and 286 may also be implemented as duplicate sets of synchronized registers, contains floating-point values that result from the execution of floating-point instructions by FPUs 206 and 204 and floating-point load instructions by LSUs 296 and 298.

Coupled to GPR 284 and/or GPR 286 is a history buffer (HB) 299, which contains historical data that was once held by GPR 284 and/or GPR 286. That is, GPR 284 and/or GPR 286 hold current (newer data), while HB 299 contains older data that used to be, but no long is, stored within GPR 284 and/or GPR 286.

After an execution unit finishes execution of an instruction, the execution unit notifies GCT 238, which schedules completion of instructions in program order. To complete an instruction executed by one of CRU 290, FXUs 294 and 205 or FPUs 206 and 204, GCT 238 signals the execution unit, which writes back the result data, if any, from the assigned rename register(s) to one or more architected registers within the appropriate register file. The instruction is then removed from the issue queue and once all instructions within its instruction group have been completed, it is removed from GCT 238. Other types of instructions, however, are completed differently.

When BEU 292 resolves a conditional branch instruction and determines the path address of the execution path that should be taken, the path address is compared against the speculative path address predicted by BPU 236. If the path addresses match, no further processing is required. If, however, the calculated path address does not match the predicted path address, BEU 292 supplies the correct path address to IFAR 230. In either event, the branch instruction can then be removed from BIQ 264, and when all other instructions within the same instruction group have completed executing, from GCT 238.

Following execution of a load instruction, the effective address computed by executing the load instruction is translated to a real address by a data ERAT (not illustrated) and then provided to L1 D-cache 220 as a request address. At this point, the load instruction is removed from FXIQ 266 or 268 and placed in load reorder queue (LRQ) 209 until the indicated load is performed. If the request address misses in L1 D-cache 220, the request address is placed in load miss queue (LMQ) 207, from which the requested data is retrieved from L2 cache 216, and failing that, from another core 105 or from system memory. LRQ 209 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 210 into which effective addresses for stores are loaded following execution of the store instructions. From STQ 210, data can be loaded into either or both of L1 D-cache 220 and L2 cache 216.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 105 of FIG. 2, the hard state includes the contents of user-level registers, such as CRR 280, LCR 282, GPRs 284 and 286, FPR 288, as well as supervisor level registers 251. The soft state of core 105 includes both "performance-critical" information, such as the contents of L1 I-cache 218, L1 D-cache 220, address translation information such as DTLB 212 and ITLB 213, and less critical information, such as BHT 235 and all or part of the content of L2 cache 216. Thus, the content of such registers are fixed values that describe a real-time current architecture state register of the processor core 105.

Note that as used to describe core 105 in FIG. 2, L1 denotes lowest level of cache, which is first checked to locate an operator (in the case of an instruction (I) cache) or an operand (in the case of a data (D) cache). If the requisite operand/data is not found within the L1 cache (i.e., a "cache miss"), then the next highest level cache memory (L2 cache) is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

In one embodiment, if an unauthorized attempt is made to access processor 103 shown in FIG. 1, a core dump from the processor 103 will occur, thus preventing the nefarious attacker from accessing the hard/soft states of processor 103. A core dump includes a recorded state of memory being used by an application at the time of the attack. The core dump includes contents of a program counter, stack pointer, OS flags, etc. In one embodiment, the core dump specifically includes contents of the L1 instruction cache 218, the L1 data cache 220, the L2 cache 216, the CRR 280, LCR 282, GPR 284, and/or FPR 288 depicted and described in FIG. 2. Thus, the content of the core dump contains the "hard" state and/or the "soft" state of the core, as described/defined above.

The present invention is directed to a method, system, and/or computer program product for managing a bandwidth state of a bus within a multi-processor computer. For example, consider computer 301 (analogous to computer 101 shown in FIG. 1), which has multiple processors 303a-303d (each of which is analogous to the processor 103 shown in FIG. 1).

Within computer 301 are host busses 307a-307d, also referred to as an input/output (I/O) physical level interface in which processors 303a-303d communicate with one another. Each of the host busses 307a-307d are capable of selectively being placed into multiple bandwidth levels. That is, as shown within the expanded view of host bus 307a (which is structurally the same as host busses 307b-307d) are at least two sets of wires, depicted in FIG. 3 as lane 309a and lane 309b. Assume that each of the lanes 309a-309b contains 16 wires. Thus, lane 309a is able to handle the transfer of 16 bits (i.e., 16b, which is the same as 2 Bytes—2B) at the same time. If only lane 309a or lane 309b is active, then host bus 307a has a bandwidth of 2B. However, if both lane 309a and lane 309b are active, then host bus 307a has a bandwidth of 4B (i.e., 2B+2B).

Figure 3:
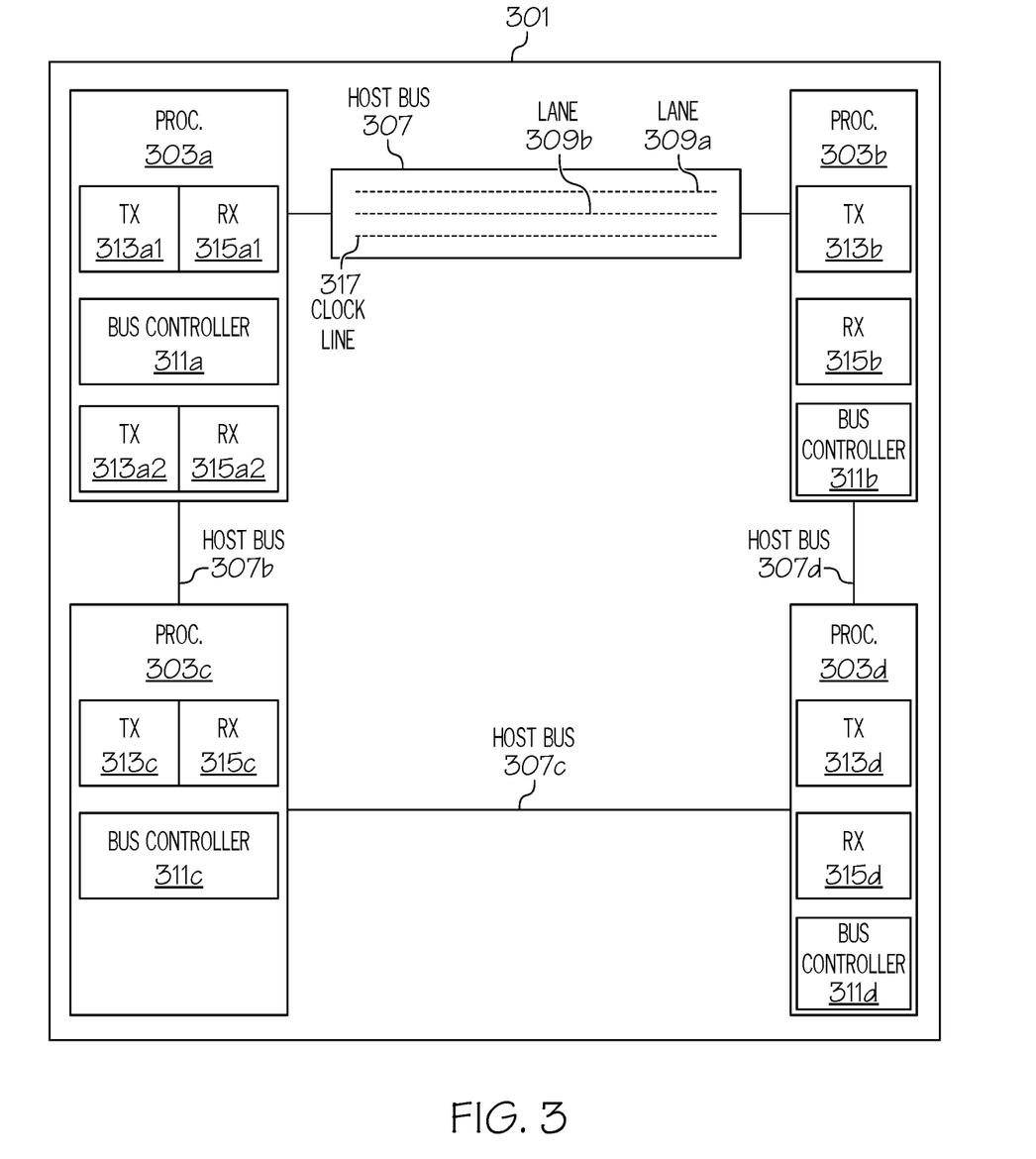
FIG. 3 depicts a simplified version of the computer shown in FIG. 1 that incorporates novel features of the present invention.

The present invention controls how many lanes are active within the exemplary host bus 307a based on required bandwidths. These required bandwidths are initially predicted required bandwidths, which are confirmed by actual required bandwidths. As long as the actual required bandwidths match the predicted required bandwidths, the number of lanes that are active will comport with the predicted/actual required bandwidths. However, the required bandwidths (predicted and/or actual) of the exemplary host bus 307a are frequently updated in accordance with one or more embodiments of the present invention, such that use of the exemplary host bus 307a is optimized while keeping power costs to a minimum.

The bus controllers 311a-311d shown in FIG. 3 control the bandwidth level of the host busses 307a-307d according to internal operations of one or more of the processors 303a-303d, and/or the requirements of transmission loads (depicted graphically as TX 313a-313d) and reception loads (depicted graphically as RX 315a-315d).

For example, assume that bus controller 311a determines, based on increased activity in IFAR 230 and/or a full L1 I-cache 218 and/or increased activity in LSU 298 shown in FIG. 2, that processor 303a is experiencing an upward trend in processing activity. As such, it is likely that an increase in TX 313a and/or RX 315a between processor 303a and the TX 313b and/or RX 315b in processor 303b will soon be occurring, requiring host bus 307a to be operating at full capacity (e.g., at the maximum bandwidth afforded by utilizing both lane 309a and lane 309b).

Similarly, an increase in TX 313a and/or RX 315a between processor 303a and the TX 313c and/or RX 315c in processor 303c will soon be occurring, requiring host bus 307b to be operating at full capacity (e.g., at the maximum bandwidth afforded by utilizing both lane 309a and lane 309b found (but not depicted) in host bus 307b).

Figure 4:
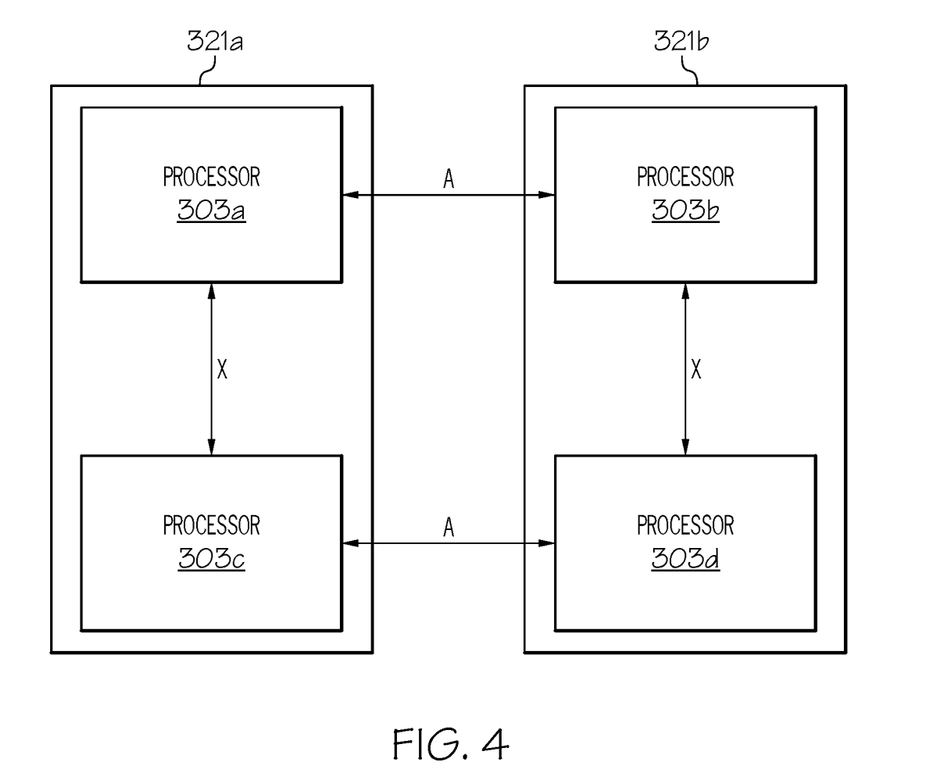
FIG. 4 illustrates a simplified version of connections between processors shown in FIG. 3.

As shown in FIG. 4, processor 303a and processor 303c are part of a first processor pair 321a, while processor 303b and processor 303d are in a second processor pair 321b. As shown in FIG. 4, there may be intra-processor pair communication (via interfaces X—analogous to part or all of host bus 307b and/or host bus 307d) or inter-processor pair communication (via interfaces A—analogous to part or all of host bus 307a and/or host bus 307c). As such and as shown in FIG. 3, bus controllers 311a-311d will enable both lane 309a and lane 309b (in the relevant host bus from host busses 307a-307d) in order to accommodate this new bandwidth requirement along either interface X or interface A.

In one or more embodiments, the present invention observes one or more events that are specific to a function of data transfer in the host busses 307a-307d to enable scaling of multi-processor computers such as computer 301 shown in FIG. 3, thereby improving the function of the computer 301 by changing the bus bandwidth from full (e.g., 4B) to half (e.g., 2B) when there is no data transfer expected to fill up the host busses 307a-307d. Similarly, the present invention will increase the bandwidth of the host busses 307a-307d from half (e.g., 2B) to full (e.g., 4B) when there is an expectation of a requirement for a large amount of data transfer by the host busses 307a-307d.

In one or more embodiments of the present invention, scaling for the computer 301 is performed based on the bandwidth utilization seen at the physical layer (e.g., one or more of the host busses 307a-307d), thereby going back and forth between the full and half bandwidth.

Moving from one bandwidth to the other results in the I/O physical interface (e.g., exemplary host bus 307a) being allowed to switch back and forth between two bandwidth levels (e.g., 4B and 2B) such that one 2B pathway (e.g., lane 309b shown in FIG. 3) can be powered off independently and brought up again to allow the host bus 307a to return to the 4B mode (in which lane 309a and lane 309b are both active).

Thus, as described herein the present invention provides a signaling mechanism from the digital logic (e.g., various processors 303a-303d within computer 301 shown in FIG. 3) to the I/O PHY (e.g., host bus 307) in which there are multiple steps of handshake operations before achieving the required change to the bandwidth state. Such a change can be considered as a different level for power save state. These handshake operations can be under the control/direction of bus controllers 311a-311d. For example, bus controller 311a in processor 303a and bus controller 311b in processor 303b can negotiate the interactions between TX 313a1 and RX 315a1 in processor 303a with RX 315b and TX 313b in processor 303b, while bus controller 311a and bus controller 311c (in processor 303c) can negotiate the interactions between TX 313a2 and RX 315a2 in processor 303a with RX 315c and TX 313c in processor 303c. Note that processors 303b-303d also have multiple TX/RX units, such as TX 313a1 and RX 315a1 and TX 313a2 and RX 315a2 shown in processor 303a, thus enabling processors 303b-303d to also negotiate sessions with multiple other processors from processors 303a-303d.

For example, a full bandwidth state (e.g., 4B) uses the most power, while a half bandwidth state (e.g., 2B) reduces power usage (perhaps by as much as 50%), while a complete shut off of the link (e.g., host bus 307a) will result in an even deeper power save state (e.g., either no power usage, or else minimal power usage required to keep the exemplary host bus 307a in a stand-by state).

In whichever power state, in order to prepare the I/O PHY to go back and forth in the power save state, there are at least two factors that are used to determine the turn ON/OFF time for a particular lane (e.g., lane 309a and/or lane 309b).

A first factor may be the individual time taken to determine whether or not to transition from one bandwidth to another. For example, if transitioning from a 4B state to a 2B state in the host bus 307, steps should be taken to ensure that the time required to evaluate the system in order to turn off a lane (e.g., lane 309b) is adequate.

A second factor may be determining whether achieving power ON/OFF (e.g., turning lane 309b on or off—i.e., activating or deactivating) will not disturb the state of the entire system. That is, if lane 309b is turned off, then should be taken to ensure that this will not result in a power spike to the exemplary host bus 307a, that the restriction to the bandwidth of the exemplary host bus 307a will not result in one or more of the processors 303a-303d operating at an unacceptably reduced capacity, etc.

For example, assume that there is a power rail (not shown in FIG. 3) that provides power to the exemplary host bus 307a and/or processors 303a-303b. As such, assume that both of the lanes 309a-309b are brought on line (i.e., in order to increase the bandwidth of host bus 307a from 0B (i.e., host bus 307a is turned off) up to 4B). If both of the lanes 309a-309b are brought up at the same time, this will result in a sudden drop in overall voltage available for all the IO's causing a power disturbance. Thus, the I/O PHY (e.g., host bus 307a) is powered up in a phased manner, in order to avoid such a voltage spike.

In order to bring up one or more lanes 309a-309b in a phased manner, in one or more embodiments of the present invention such lane staggering uses a call data recording (CDR) interface that reports states of various processors 303a-303d within computer 301. This allows each of the lanes 309a-309b to go up (active) or down (inactive) separately, such that the present system can abort the sequence and come back up and vice versa during power on/power off. Thus, by starting with one lane or one set of lanes at a time, handshakes (i.e., interchanges of information) with the I/O PHY (e.g., host bus 307a) allow the system to abort the sequence if the need to power up a lane is aborted by the digital logic (e.g., the bus controller 311a).

Staggering the power off and/or power on of the lanes/bus therefore does not cause a disturbance in the power line/bus. In order to ensure that such a disturbance does not occur during the powering down of a bus (e.g., host bus 307a), the exemplary bus controller 311a first powers down lane 309b (e.g., a first data path) as the first stage of the power down of host bus 307a. The bus controller 311a then powers down lane 309a (another data path). As both data paths are now powered down, there is no longer a need for a clock signal. Thus, the bus controller 311a and/or bus controller 313b will now power down the clock line 317 that is within (as depicted) or external to the host bus 307a.

Conversely, then the exemplary host bus 307a is re-powered up, the sequence will be reversed, such that the clock line 317 comes on first, followed by the (data path) lane 309a coming on line, and then the (data path) lane 309b coming on line (if a full 4B bandwidth is needed).

Thus, by looking at the actual occurrence of events in the digital logic with multiple workloads, various kinds of workloads trigger traffic in multiple ways. For example, consider table 500 shown in FIG. 5.

Figure 5:
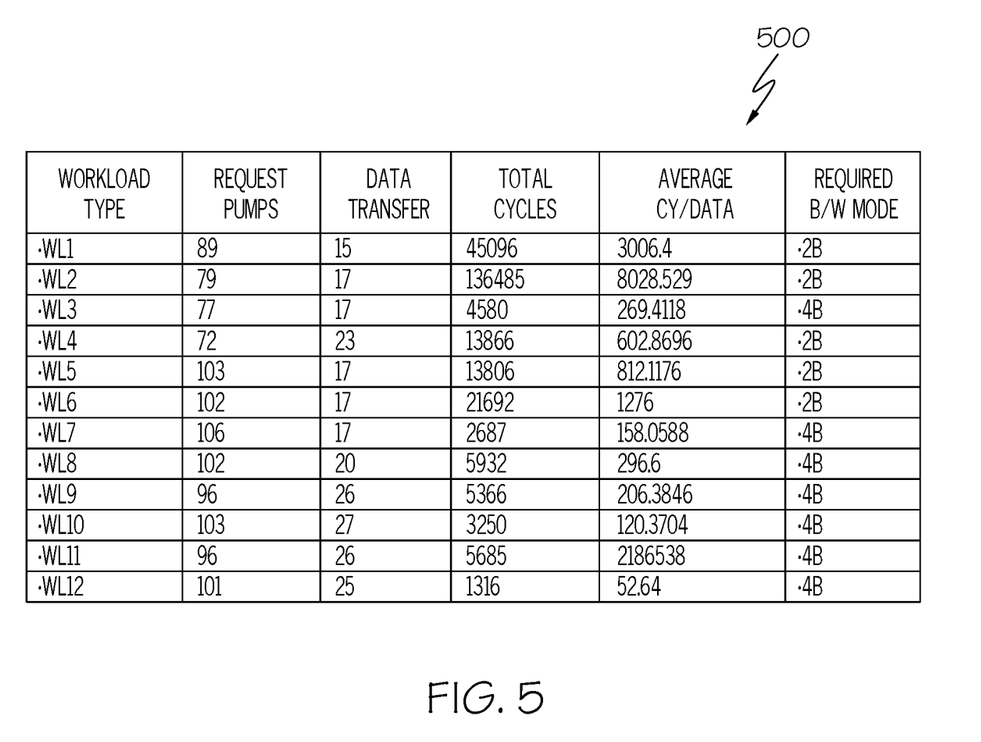
FIG. 5 illustrates an exemplary table of different types of workloads that determine whether or not an intra-processor bus transitions from a first bandwidth to a second bandwidth.

Table 500 depicts 12 different types of workloads (labeled in table 500 as workload types WL1-WL12) that may be handled by the processors 303a-303d shown in FIG. 3. What these types of workloads actually do is secondary to their demands on the processor(s) 303a-303d. For example, consider WL1, which has 89 request pumps, 15 data transfer operations, which require a total of 45096 clock cycles, for an average of 3006.4 clock cycles required to handle each data transfer. Since there are so many clock cycles used to move data through the I/O PHY (e.g., host bus 307a shown in FIG. 3) when handling TX 313a1/313a2 and/or RX 315a1/315a2 operations (request pumps and/or data transfers), the exemplary host bus 307a only needs to be running at a lower bandwidth level (e.g., 2B). That is, the high number of clock cycles needed to transfer data indicate that the data is hard to access (e.g., the data is spread out in memory—has a "high stride" distance between pieces of the data), or the data is found in a distance memory such as system memory rather than a local L1 cache, etc. As such, the bandwidth demand on the host bus 307a is low, since much time is spent waiting for data to become available to the host bus 307a for transference between the processors 303a-303b.

However, WL3 has an average clock to data ratio of 269.4118. As such, there are fewer clock cycles used since the data is likely readily available in local cache, etc. or the workload is timed so much that it need not go out to fetch data and it is contained within the local memory. As such, the bandwidth demand on the host bus 307a is high, since the data is primed and ready for the host bus 307a to communicate among the processors 303a-303b.

The categorization of the workload types WL1-WL12 shown in table 500 can be according to various factors. Furthermore, beside known load requirements (e.g., average cycles per data transfer), predictive load requirements can be made based on various workload configurations.

For example, there can be a continuous fetch of data from a remote chip's memory or cache which are sequential to multiple random fetches that are hard to predict. Furthermore, multiple performance modes can be envisioned through policies, where the bandwidth transitioning will follow the broadly defined rules.

Thus, a workload configuration that has a high memory write stride (i.e., the address distance in memory between sequential units of data retrieved during a data transfer is large) is equivalent (based on timing and resource usage) to random transactions being executed. Similarly, a workload configuration based on a memory write stride single thread is equivalent to a sudden offset of fabric transactions, in other words, data from the remote memory over the host bus or interchip bus that connects two processors, thus affecting the bandwidth requirement from the I/O PHY. Similarly, a memory write single thread (equivalent to a sudden offset of constant data writing) will affect the bandwidth requirement from the I/O PHY (host bus), just as will a memory write thread (equivalent to a complete fabric transaction of all of the thread).

In accordance with one or more embodiments of the present invention, a "Turn ON" time for increasing the bandwidth of the I/O PHY (host bus) is considered in order to avoid losing any of the performance related aspects of the processor chip and hence the system performance (e.g., for computer 101). Thus, a very high comprehensive power to performance policy can be implemented if the control of turning ON the physical links is done in a staged manner. In that case, the I/O PHY logic (e.g., bus controller 311a shown in FIG. 3) can be signaled by the digital logic within the processors 303a-303d based on their current trend workload performance. This leads to aborting an unnecessary call to transition from half width (bandwidth) to full width (bandwidth) and vice versa. This also gives the system a cushion for cyclic workloads that are so small that they can be muted by using the time available for width transitioning. Thus, by the digital logic along with the power on/off sequencing being interleaved to handshake and work together, the system can prevent false alarms that would unnecessarily turn ON/OFF the link.

Consider now the following processes in which the system allows the I/O PHY layer to continue with bandwidth transition or to abort such bandwidth transitions. The power ON and power OFF are broadly classified as shown below. Hence, the system takes a specific/definite amount of time to serially traverse through these steps shown below, in order to enable a link power on or link power off. The capability to abort the sequence and stay in the same state is implemented as part of digital logic (e.g., bus controller 311a) so that it gives another opportunity to react to false alarms from the nest, and hence not alter the width transitioning in the physical layer.

Figure 6:
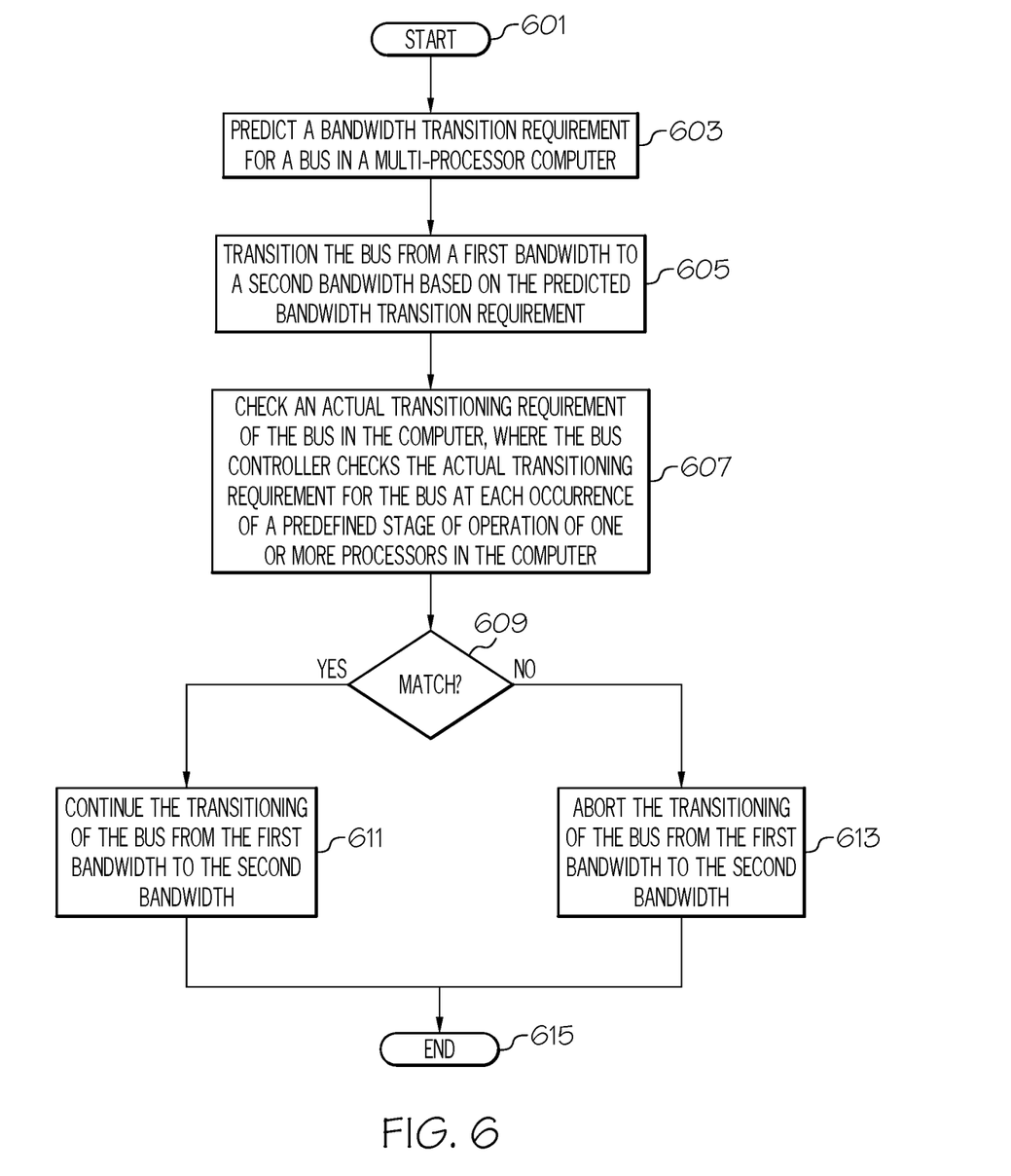
FIG. 6 is a high-level flow chart of exemplary steps taken by hardware devices to stage a power on/off and/or to abort an on/off sequence at the I/O physical level in an interchip interface based on an indication from logic during bus width transition in accordance with one or more embodiments of the present invention.

POWER OFF
TX 313a1 and/or RX 315a1 shown in FIG. 3 sync power off on either side
Power save mode is asserted on either side
Data path in the I/O PHY is powered down
Power Save mode enable is asserted
Fence (isolation of the I/O PHY) is set to ON
POWER ON
TX 313a1 and RX 315a1 sync for power up on either side
Power save mode is deasserted on either side in the pervasive
Data and CLK path are turned ON
RX 315a1 circuit is recharged to working state
FIFO and deserializer is locked based on a pseudorandom binary sequence (PRBS) pattern
TX fence is dropped and functional traffic is set to ON With reference now to FIG. 6, a high-level flow chart of exemplary steps taken by hardware devices to stage a power on/off and/or to abort an on/off sequence at the I/O physical level in an interchip interface based on an indication from logic during bus width transition in accordance with one or more embodiments of the present invention is presented.

After initiator block 601, a bus controller (e.g., bus controller 311a shown in FIG. 3) predicts a bandwidth transition requirement for a bus (e.g., host bus 307a) in a multi-processor computer (e.g., computer 301), as described in block 603. As described herein, this prediction can be based on current workloads in the cores (see FIG. 2) within the processors, a table that describes various workloads and their bus bandwidth requirements (see FIG. 5), system rules, etc.

As described in block 605 in FIG. 6, the bus controller initially transitions the bus from a first bandwidth (e.g., 2B) to a second bandwidth (e.g., 4B) based on the predicted bandwidth transition requirement.

As described in block 607, the bus controller checks an actual transitioning requirement of the bus in the computer. That is, the bus controller checks to see what the current real-time bandwidth requirement for the bus is based on current workloads. In one or more embodiments of the present invention, the bus controller checks the actual transitioning requirement for the bus at each occurrence of a predefined stage of operation of one or more processors in the computer. Examples of such a predefined stage of operation includes, but is not limited to, one or more processors implementing a new workload type; one or more processors retrieving a new set of data during a pending workload; one or more processors switching from transmitting (TX 313a1 in FIG. 3) to receiving (RX 315b) data to the host bus 307a; one or more processors switching from receiving (RX 315a) to transmitting (TX 313b) to data to the host bus 307a; etc.

As shown in query block 609, a query is made by the bus controller as to whether the actual transitioning requirement matches the predicted bandwidth transition requirement. That is, the transition has been predictively initiated. The bus controller will then determine whether or not the prediction was accurate.

If so, then the bus controller directs a continuation of the transitioning of the bus from the first bandwidth to the second bandwidth, as described in block 611. However, if the actual transitioning requirement does not match the predicted bandwidth transition requirement, then the transition of the bus from the first bandwidth to the second bandwidth is aborted (block 613).

The flow chart ends at terminator block 615.

As described herein, in one or more embodiments the first bandwidth is higher (e.g., 4B) than the second bandwidth (e.g., 2B), while in other embodiments the first bandwidth is lower (e.g., 2B) than the second bandwidth (e.g., 4B).

As described herein, in one or more embodiments of the present invention the bus controller predicts the future bandwidth requirement of the bus based on a workload type for a pending workload in the one or more processor cores (see table 500 in FIG. 5).

As described herein, in one or more embodiments of the present invention, the bus controller detects an average cycles/data ratio for the pending workload, where the average cycles/data ratio describes an average number of clock cycles required to perform data transfers for the workload type of the pending workload, and then transitions the bus from the first bandwidth to the second bandwidth based on the average cycles/data ratio for the workload type of the pending workload (see table 500 in FIG. 5).

As described herein and in one or more embodiments of the present invention, the bus (e.g., host bus 307a shown in FIG. 3) includes a data line (e.g., lane 309a and/or lane 309b) and a clock line (e.g., clock line 317). This configuration enables the bus controller to first transition the data line from the first bandwidth to the second bandwidth, and then, in response to the data line transitioning from the first bandwidth to the second bandwidth, to adjust the clock line to match needs of the transitioned data line (e.g., turning the clock line off or on).

In one or more embodiments of the present invention, the multi-processor computer (e.g., computer 301 shown in FIG. 3) comprises a separate bus between each pair of processors within the multi-processor computer (e.g., host busses 307a-307d). As shown in FIG. 3, each processor in the multi-processor computer comprises a separate bus controller (e.g., bus controllers 311a-311d), and each processor in the multi-processor computer comprises a processor core (e.g., core 105 shown in FIG. 2). In one or more embodiments of the present invention, the bus controllers negotiate a staged sequence of transitioning from the first bandwidth to the second bandwidth for each bus connecting said each pair of processors. The bus controllers thus selectively abort or complete the transitioning from the first bandwidth to the second bandwidth for each bus connecting said each pair of processors based on outputs from processor cores in the pair of processors, where the outputs are processed by bus controllers in the pair of processors to determine whether to abort or complete the transitioning from the first bandwidth to the second bandwidth for each bus connecting said each pair of processors based on predicted workloads in the cores (e.g., as determined by activity in predecode logic 202, contents of MMU 211, L1 I-cache 218, etc.).

Thus, as described herein the present invention relates to enhancing signaling the I/O PHY by:
1. Transition logic that checks for the transitioning requirement after every step to decide on the continuity to transition from one width to the other. If the digital logic still holds the signal to transition, the transition logic will continue to do the transition.
2. Policy driven transition, where the transition is either ON/OFF (GO or ABORT) and by stopping at each stage and looking for the go ahead from digital logic (e.g., a nest or link where the prediction happens).
3. Dynamically configuring the values for GO or ABORT at any point in time.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
   predicting, by a bus controller, a bandwidth transition requirement for a bus in a multi-processor computer, wherein the bus connects two processors within the multi-processor computer;
   transitioning, by the bus controller, the bus from a first bandwidth to a second bandwidth based on the predicted bandwidth transition requirement;
   checking, by the bus controller, an actual transitioning requirement of the bus in the multi-processor computer, wherein the bus controller checks the actual transitioning requirement for the bus at each occurrence of a predefined stage of operation of one or more processors in the multi-processor computer; and
   in response to the actual transitioning requirement matching the predicted bandwidth transition requirement, directing, by the bus controller, a continuation of the transitioning of the bus from the first bandwidth to the second bandwidth.

2. The method of claim 1, wherein the first bandwidth is higher than the second bandwidth.

3. The method of claim 1, wherein the first bandwidth is lower than the second bandwidth.

4. The method of claim 1, wherein the transitioning from the first bandwidth to the second bandwidth occurs in multiple phases, and wherein the method further comprises:
   validating, by the bus controller, the continuation of the transitioning of the bus from the first bandwidth to the second bandwidth at a completion of each of the multiple phases.

5. The method of claim 1, wherein the transitioning from the first bandwidth to the second bandwidth occurs in multiple phases, and wherein the method further comprises:
   validating, by the bus controller, the transitioning of the bus from the first bandwidth to the second bandwidth during each of the multiple phases.

6. The method of claim 1, wherein the predefined stage of operation of the one or more processors occurs when one or more of the processors implement a new type of workload.

7. The method of claim 1, wherein the predefined stage of operation of the one or more processors occurs when one or more of the processors retrieves a new set of data during a pending workload in the one or more processors.

8. The method of claim 1, further comprising:
   in response to the actual transitioning requirement not matching the predicted bandwidth transition requirement, aborting the transitioning of the bus from the first bandwidth to the second bandwidth.

9. The method of claim 1, wherein the bus comprises a data line and a clock line, and wherein the method further comprises:
   transitioning, by the bus controller, the data line from the first bandwidth to the second bandwidth; and
   in response to the data line transitioning from the first bandwidth to the second bandwidth, adjusting, by the bus controller, the clock line to match needs of the transitioned data line.

10. The method of claim 1, wherein the multi-processor computer comprises a separate bus between each pair of processors within the multi-processor computer, wherein each processor in the multi-processor computer comprises a separate bus controller, wherein each processor in the multi-processor computer comprises a processor core, and wherein the method further comprises:
    negotiating a staged sequence of transitioning from the first bandwidth to the second bandwidth for each bus connecting said each pair of processors; and
    selectively aborting or completing the transitioning from the first bandwidth to the second bandwidth for each bus connecting said each pair of processors based on outputs from processor cores in the pair of processors, wherein the outputs are processed by bus controllers in the pair of processors to determine whether to abort or complete the transitioning from the first bandwidth to the second bandwidth for each bus connecting said each pair of processors based on predicted workloads in the processor cores.

11. The method of claim 1, wherein transitioning the bus from the first bandwidth to the second bandwidth is performed by powering up a pair of wires in the bus, and wherein the method further comprises:
    determining that powering up the pair of wires in the bus will result in a decreased capacity of processors that are connected by the bus; and
    in response to determining that powering up the pair of wires in the bus will result in the decreased capacity of processors that are connected by the bus, aborting the transitioning of the bus from the first bandwidth to the second bandwidth.

12. The method of claim 1, wherein transitioning the bus from the first bandwidth to the second bandwidth is performed by powering off a pair of wires in the bus, and wherein the method further comprises:
    determining that powering off the pair of wires in the bus will result in a power spike to other wires in the bus; and in response to determining that powering off the pair of wires in the bus will result in the power spike to other wires in the bus, aborting the transitioning of the bus from the first bandwidth to the second bandwidth.

13. The method of claim 1, further comprising:
detecting an increase in activity in one or more components of a core in a processor from the multi-processor computer, wherein the one or more components of the core are from a group consisting of an instruction fetch address register (IFAR), a L1 instruction cache (L1 I-cache), and a load store unit (LSU); and
in response to detecting the increase in the activity in the one or more components of the core, predicting the bandwidth transition requirement for the bus and increasing a bandwidth of the bus.

14. The method of claim 1, wherein the bus comprises multiple wires, and wherein the transitioning, by the bus controller, of the bus from the first bandwidth to the second bandwidth is achieved by selectively activating pairs of wires from the multiple wires.

15. A computer program product for transitioning a bus from a first bandwidth to a second bandwidth, the computer program product comprising a non-transitory computer readable storage medium having program code embodied therewith, the program code readable and executable by a processor to perform a method comprising:
predicting a bandwidth transition requirement for a bus in a multi-processor computer, wherein the bus connects two processors within the multi-processor computer;
transitioning the bus from a first bandwidth to a second bandwidth based on the predicted bandwidth transition requirement;
checking an actual transitioning requirement of the bus in the multi-processor computer, wherein the bus controller checks the actual transitioning requirement for the bus at each occurrence of a predefined stage of operation of one or more processors in the multi-processor computer; and
directing, in response to the actual transitioning requirement matching the predicted bandwidth transition requirement, a continuation of the transitioning of the bus from the first bandwidth to the second bandwidth.

16. The computer program product of claim 15, wherein the first bandwidth is higher than the second bandwidth.

17. The computer program product of claim 15, wherein the first bandwidth is lower than the second bandwidth.

18. The computer program product of claim 15, wherein the bus controller predicts the bandwidth transition requirement of the bus based on a workload type for a pending workload in the one or more processors.

19. The computer program product of claim 18, wherein the method further comprises:
detecting an average cycles/data ratio for the pending workload, wherein the average cycles/data ratio describes an average number of clock cycles required to perform data transfers for the workload type of the pending workload; and
transitioning the bus from the first bandwidth to the second bandwidth based on the average cycles/data ratio for the workload type of the pending workload.

20. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
program instructions to predict a bandwidth transition requirement for a bus in a multi-processor computer, wherein the bandwidth transition requirement of the bus is predicted based on a workload type for a pending workload in one or more processors in the multi-processor computer, and wherein the bus connects two processors within the multi-processor computer;
program instructions to detect an average cycles/data ratio for the pending workload, wherein the average cycles/data ratio describes an average number of clock cycles required to perform data transfers for the workload type of the pending workload; and
program instructions to transition the bus from a first bandwidth to a second bandwidth based on the average cycles/data ratio for the workload type of the pending workload;
program instructions to check an actual transitioning requirement of the bus in the multi-processor computer, wherein the bus controller checks the actual transitioning requirement for the bus at each occurrence of a predefined stage of operation of one or more processors in the multi-processor computer; and
program instructions to, in response to the actual transitioning requirement matching the predicted bandwidth transition requirement, direct a continuation of the transitioning of the bus from the first bandwidth to the second bandwidth.

* * * * *